June 13, 1950 B. J. LAWRENCE 2,511,673

HIGH-FREQUENCY RECEIVER CIRCUITS

Filed Feb. 6, 1947

Inventor:
Benjamin J. Lawrence,
by Merton D. Morse
His Attorney.

Patented June 13, 1950 2,511,673

UNITED STATES PATENT OFFICE 2,511,673

HIGH-FREQUENCY RECEIVER CIRCUITS

Benjamin J. Lawrence, Milford, Conn., assignor to General Electric Company, a corporation of New York Application February 6, 1947, Serial No. 726,770

4 Claims. (Cl. 179—171)

My invention relates to high frequency receivers of the type adapted to operate over a large range of frequencies and it has for its primary object to provide new and improved means for minimizing attenuation of received signals as the receiver circuits are tuned over the range.

It is another object of my invention to provide a new and improved grounded grid amplifier which is adapted to operate over a wide range of high frequencies.

It is a further object of my invention to provide new and improved amplifier circuits particularly adapted for a television receiver.

Briefly stated, my invention is concerned particularly with television receivers of the type having a large number of high frequency circuits pretuned to desired television channels and arranged so that a desired one of the circuits may be easily and rapidly switched into operative circuit connection with the remaining portions of the receiver.

In such a receiver, I employ a grounded grid amplifier having a variable inductance in its cathode circuit, the inductance being correlated with the arrangement for switching to desired channels so that, as the shunting effect of the inter-electrode capacitance of the amplifier varies with the frequency of the television signals being received, the value of inductance in the cathode circuit is adjusted to neutralize the inter-electrode capacitance of the amplifier and prevent attenuation of received television signals.

The features of my invention which I believe to be novel are set forth with particularity in the appended claims. My invention itself, however, together with further objects and advantages thereof, may best be understood by reference to the following description taken in connection with the accompanying drawing, in which Fig. 1 is a portion of the high frequency circuits of a television receiver which includes the circuit arrangements of my invention; and Fig. 2 is an exploded elevation view of a portion of a switch and transformer arrangement employed with the circuit of Fig. 1.

Figure 1:
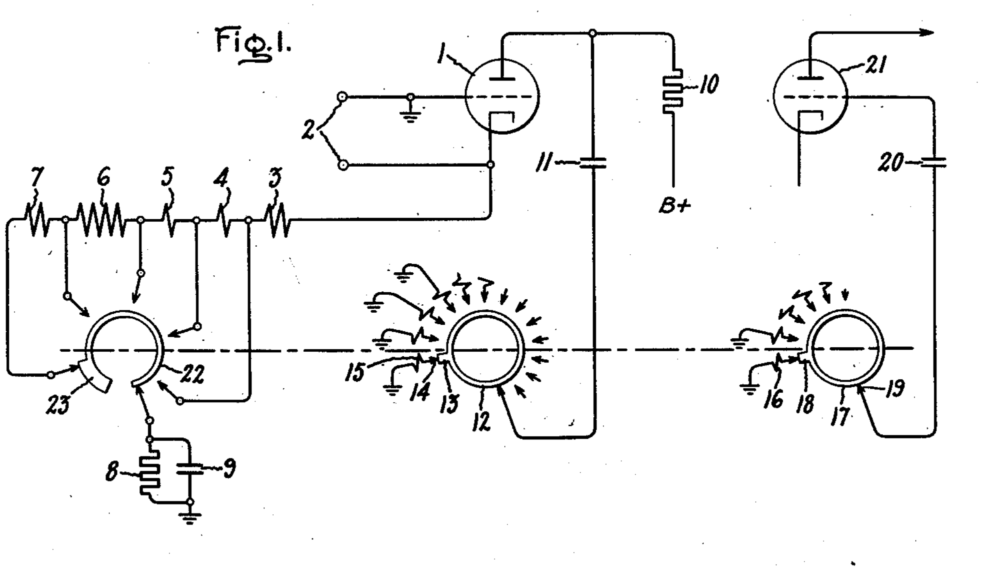
Figure 2:
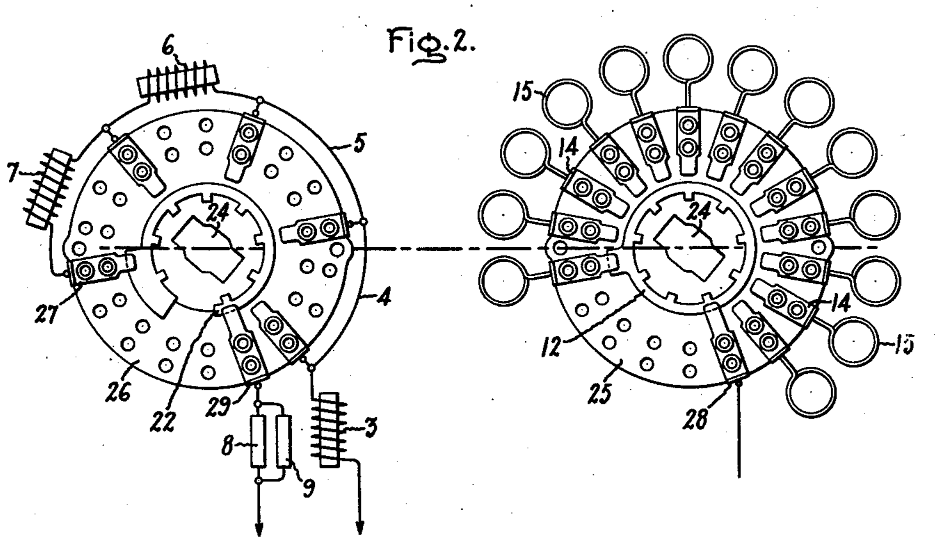

Referring to Fig. 1, I have there shown a portion of the high frequency circuit of a television receiver which comprises a high frequency amplifier of the grounded grid type. The high frequency amplifier comprises an electron discharge device 1 having its cathode and grid connected to input terminals 2 to which high frequency signals received by the usual television antenna not shown) are supplied. In such an amplifier, the grid-cathode and cathode-heater elements of the electron discharge device comprise a capacitance which is shunted across the input circuit and which, by its by-passing effect for high frequencies, tends to reduce the intensity of the strength of the received signals which are actually impressed between the grid and cathode. This shunting effect due to the input capacitance varies with the frequency of the impressed signals, increasing in magnitude as the signals increase in frequency, and has an extremely undesirable attenuating effect at the very high frequencies employed in the highest television channels. In order to eliminate or cancel out the undesired by-passing effect of this input capacitance of the electron discharge device 1, the cathode of the device is connected to ground, in a manner to be pointed out later, through one or more of a plurality of serially connected inductances 3–7 and a cathode biasing resistance 8 shunted by a by-pass capacitor 9.

The anode of the electron discharge device 1 is supplied with operating potential from any suitable source of voltage, indicated by the legend B+, through a decoupling resistance 10 and is coupled through a capacitor 11 to the rotary element 12 of a rotary switch. The rotary element 12 includes a contact 13 which is adapted to engage one of a plurality of contacts 14 arranged about the circumference of the rotary switch. To each of the contacts 14 there is connected one terminal of a radio frequency coil 15, the other terminal of the coil 15 being grounded. A large number of such coils 15 are arranged about the periphery of the rotary switch, the number depending upon the number of television channels desired to be received by the television receiver. Each of the coils 15 is of an inductance such that it resonates with the fixed capacitance of the other circuit elements in the anode circuit at the frequency of a particular television channel. Thus, each coil constitutes a circuit which is pretuned to a desired television channel. Any number of such circuits up to 17 may be connected to a rotary switch of this type.

Each of the coils 15 is coupled to a respective one of a plurality of coils 16 which are arranged in similar fashion about the periphery of a second rotary element 17 of the same rotary switch of which the element 12 forms one portion. Each of the coils 16 has one terminal connected to ground and the other terminal connected to a contact 18 on the rotary element 17. The element 17 is, in turn, connected through a contact 19 and a coupling capacitor 20 to the control electrode of a converter tube 21. Thus, each of the coils 16, as it is connected by means of the members 17, 18 to the converter tube 21, constitutes a converter grid coil to which high frequency energy is coupled from a corresponding high frequency coil 15 and also from a local oscillator coil (not shown) to which coil 16 is also coupled. The elements 12, 17 are shown as being mechanically linked for unicontrol operation so that the contacts 13, 18 connect in circuit corresponding ones of the coils 15, 16.

In order to provide a proper inductance in the cathode circuit of the high frequency amplifier to resonate the previously-mentioned undesired inter-electrode capacitance, a third rotary element 22, mechanically connected to the elements 12, 17 for unicontrol operation therewith, is arranged to connect in the cathode circuit of the high frequency amplifier one or more of the inductances 3–7. The rotary element 22 is provided with a contact finger 23 which has a peripheral length three times as large as the peripheral length of the contacts 13, 18, so that the total number of compensating inductances 3–7 required in a receiver is smaller than the number of high frequency coils 15 and converter grid coils 16. In this fashion, each of the inductances provides compensation over several of the television channels, the total inductance connected in the cathode circuit being a minimum at the highest frequency channel and increasing as the receiver is connected for the reception of lower frequency signals.

In the position shown in Fig. 1, the rotary elements 12, 17, 22 are connected for reception of the lowest frequency channel of television signals. The contact 23 thus is arranged to connect all five inductances 3–7 in series between the cathode of the electron discharge device 1 and ground. The same connection is maintained for the three lowest channels of television signals. When the rotary switch, however, is turned for reception of the fourth television channel, the inductance 7 is removed from the cathode circuit and inductances 3–6 comprise the total inductance in the cathode circuit. Thus, at each third channel, as the tuning progresses toward the highest frequency signals, one of the inductances 3–7 is removed from the cathode circuit to provide the proper amount of inductance which gives operation over a short range.

Considered in another way, the inductances 3–7 and the inter-electrode capacitance of the device 1 constitute a parallel resonant circuit which maintains a high impedance between the the cathode and ground to minimize attenuation of received signals. This resonant circuit is a relatively low quality circuit having a ratio of resistance to inductance such that its resonance curve is quite broad. The proper amount of inductance is chosen by means of switch element 22 to produce peak resonance at the center of the three adjacent television channels. In this way, the successive connections of the inductances 3–7 in the cathode circuit are sufficient to compensate for the detrimental effects of inter-electrode capacitance over three adjacent television channels, exact compensation being provided at the frequency of the center one of these three channels.

In Fig. 2, I have shown an exploded view of the physical structures of a high frequency circuit and compensating inductance circuit in relation to the rotary elements of a rotary switch. The rotary elements 12, 22 constitute the center portion of the separate wafers of a rotary switch. As indicated, the rotary elements are coaxially aligned for operation by a single shaft (not shown) which projects through apertures 24 at the center of the rotary elements. The wafers include stationary disks or elements 25, 26. Upon the disk 25 are arranged radially extending contacts 14, the number corresponding to the number of television channels to be received. Upon the disk 26, however, radially extending contacts 27 are arranged in positions corresponding to every third one of the contacts 14 on the disk 25. The high frequency coils 15 are arranged around the circumference of the stationary disks 25 and respective of the coils are connected to respective of the contacts 14. Preferably, the converter grid coils 16 are similarly arranged around the periphery of a disk (not shown) corresponding to the disk 25 and closely spaced to the disk 25, so that the coupling between the respective high frequency and converter grid coils may be controlled by adjusting the spacing between these coils. Connection between the rotary element 12 and the anode circuit of the discharge device 1 shown in Fig. 1 is made by means of a contact 28.

The compensating inductances 4–7 are arranged around the periphery of the disk 26 and are supported from the radially extending contacts 27. The inductance 3, which is permanently connected in the cathode circuit, is connected between the last of the contacts 27 and the cathode of the discharge device 1. Connection between the rotary element 22 and the resistor 8 and capacitor 9, shown in Fig. 1, is made by means of a contact 29. In the construction of the compensating inductances 3–7, all of the inductances are connected in circuit through the three lowest channels and inductances 3–6 through the fourth to the sixth channels. As is well known, there is a substantial frequency difference between the sixth and seventh television channels as presently allocated. Consequently, a substantial change in inductance is required at this point. In addition, I have found that sufficient inductance is provided to form the inductances 4 and 5 simply by connecting single loops of wire respectively between the third and fourth and fourth and fifth of the contacts 27, as the frequency difference between these adjacent channels is quite small.

An important advantage of my improved high frequency receiver circuit is that it permits the use of a grounded grid amplifier and compensates for the by-passing effect of the inter-electrode capacitance of such an amplifier, as the signals received by the receiver are varied over a very wide range of high frequency. By arranging the compensating inductances around the periphery of a rotary switch and selecting the values of the inductances so that they compensate over several television channels, it is possible to construct a television receiver in which all of the high frequency circuits are pretuned to the various channels and may be selected simply by rotation of a single switch. At the same time, substantially maximum strength of the higher frequency received signals for each channel is assured by minimizing attenuation of those signals by the inter-electrode capacitance of the amplifier. Another advantage of the construction illustrated is that a minimum number of cathode inductances is required, the utilization of one inductance to compensate several channels effecting substantial saving both in space and expense.

While I have shown a particular embodiment of my invention, it is to be understood that I do not wish to be limited thereto, since various modifications may be made and I contemplate by the appended claims to cover all such modifications as fall within the true spirit and scope of my invention.

What I claim as new and desire to secure by Letters Patent of the United States is:

1. In a high frequency receiver having a plurality of circuits arranged for the reception of a band of signals varying over a wide range of frequencies and means for selecting respective of said circuits for the reception of signals in respective of said bands, the combination comprising a high frequency amplifier having a cathode and a control electrode, said control electrode being connected to a point of fixed potential, means for impressing received signals between said cathode and electrode, the inter-electrode capacitance of said amplifier undesirably attenuating said signals, means to reduce said attenuation comprising an inductance connected in series circuit between said cathode and said point, said inductance having a plurality of taps, and means selecting different of said taps for varying the value of said inductance as said respective circuits are selected to resonate said capacitance at a frequency substantially equal to the frequency of signals being received.

2. The combination, in a high frequency receiver, of an electron discharge device having an anode, a cathode and a control electrode, said control electrode being connected to a point of fixed potential, means for impressing received signals between said cathode and control electrode, the inter-electrode capacitance of said device undesirably attenuating said signals, a plurality of circuits pretuned to different frequencies over a wide range of frequencies, means for selectively connecting respective of said circuits to said anode, an inductance connected between said control electrode and cathode, said inductance having a plurality of taps, and means for selecting different of said taps for varying the value of said inductance with the selection of said high frequency circuits to resonate said capacitance substantially at the resonance frequency of the selected circuit.

3. In a television receiver, the combination comprising a high frequency amplifier having an anode and a cathode, a pair of insulating disks having a plurality of contacts arranged around the periphery thereof, respective high frequency coils connected to the contacts of one of said disks, the coils connected to adjacent of said disks being tuned to the frequencies of adjacent television channels, respective inductances connected in series between the contacts of the other of said disks, and means for selectively connecting said coils in circuit with said anode to adjust said receiver for the reception of signals in a desired television channel and for connecting respective of said inductances in series circuit between said cathode and ground to resonate the inter-electrode capacitance of said amplifier substantially at the frequency of the selected channel.

4. In a television receiver, the combination comprising a high frequency amplifier having an anode, a cathode and a control electrode, said control electrode being connected to ground, means for impressing received signals between said cathode and control electrode, a pair of insulating disks having a plurality of contacts arranged around the periphery thereof, respective high frequency coils connected to the contacts of one of said disks, adjacent of said coils being resonant at the frequency of adjacent television channels desired to be received, the other of said disks having a smaller number of contacts than said one disk, respective inductances having terminals connected to adjacent contacts of said other disks, and means for selectively connecting said coils in circuit with said anode to adjust said receiver for the reception of television signals in a desired channel and for connecting said inductances in series circuit between said cathode and ground to resonate the inter-electrode capacitance of said amplifier substantially at the center frequency of a plurality of adjacent channels.

BENJAMIN J. LAWRENCE.

REFERENCES CITED

The following references are of record in the file of this patent:

UNITED STATES PATENTS

| Number | Name | Date |
|---|---|---|
| 2,012,492 | Arnold et al. | Aug. 27, 1935 |
| 2,106,054 | Leighton | Jan. 18, 1938 |
| 2,155,126 | Goldmark | Apr. 18, 1939 |